United States Patent [19]

Rose

[11] 4,255,033
[45] Mar. 10, 1981

[54] UNIVERSAL FOCUS MULTIPLANAR CAMERA

[76] Inventor: Gordon M. Rose, 27 Heathgate, London NW11 7AP, England

[21] Appl. No.: 14,651

[22] Filed: Feb. 23, 1979

[51] Int. Cl.³ .................... G03B 35/00; G03B 33/10; B44C 3/02
[52] U.S. Cl. .................................... 354/110; 156/58; 354/103
[58] Field of Search .......................... 355/32, 77, 20; 354/100, 103, 104, 110, 118, 119, 120; 156/58

[56] References Cited

U.S. PATENT DOCUMENTS

| | | | |
|---|---|---|---|
| 1,637,294 | 7/1927 | Cuenin | 354/104 |
| 2,214,228 | 9/1940 | Eppensteiner | 354/118 |
| 2,232,144 | 2/1941 | Sersen | 355/77 X |
| 2,651,233 | 9/1953 | Tondreau et al. | 354/110 |
| 2,749,820 | 6/1956 | Garutso | 354/103 |
| 2,928,311 | 3/1960 | Strauss | 354/113 X |
| 3,510,657 | 5/1970 | Mangiaracina et al. | 354/110 X |
| 3,563,635 | 2/1971 | De Lang | 354/103 X |
| 3,868,283 | 2/1975 | Scheyer | 156/58 |

Primary Examiner—Donald A. Griffin

[57] ABSTRACT

Conventional cameras and other optical instruments produce images upon one plane only. Objects at differing ranges from the lens of such cameras cannot appear upon that plane in-focus simultaneously, and the operator, hence the viewer, is obliged to choose one primary plane of interest in which the major subject lies; all other objects at other ranges will be out of focus.

The invention described produces photographic images that are in-focus at all ranges.

This is achieved by dividing the original scene into two or more images focussed upon different ranges, and eliminating from each image those parts that are out-of-focus. The remaining in-focus parts of each image are then reconstituted into a single image for presentation.

The elimination of blurred parts may be done by comparison of one sub-image with another, or by the subjective intervention of an operator using a mathmatical support system.

The images described may be applied to still or motion photography, film or electronic.

8 Claims, 21 Drawing Figures

| 001001 | 001002 | 001003 | 001004 | 001005 | 001006 |
|---|---|---|---|---|---|
| 002001 | 002002 | 002003 | 002004 | 002005 | 002006 |
| 003001 | 003002 | 003003 | 003004 | 003005 | 003006 |
| 004001 | 004002 | 004003 | 004004 | 004005 | 004006 |
| 005001 | 005002 | 005003 | 005004 | 005005 | 005006 |
| 006001 | 006002 | 006003 | 006004 | 006005 | 006006 |
| 007001 | 007002 | 007003 | 007004 | 007005 | 007006 |
| 008001 | 008002 | 008003 | 008004 | 008005 | 008006 |
| 009001 | 009002 | 009003 | 009004 | 009005 | 009006 |

FIG. 10.

| 9 | 9 | 9 | 9 | 9 | 9 |
|---|---|---|---|---|---|
| 9 | 9 | 9 | 9 | 9 | 9 |
| 9 | 9 | 9 | 9 | 9 | 9 |
| 9 | 9 | 9 | 9 | 9 | 9 |
| 9 | 9 | 9 | 9 | 9 | 9 |
| 9 | 9 | 9 | 9 | 9 | 9 |
| 9 | 9 | 9 | 9 | 9 | 9 |
| 9 | 9 | 9 | 9 | 9 | 9 |
| 9 | 9 | 9 | 9 | 9 | 9 |

FIG. 11.

| 8 | 8 | 6 | 6 | 8 | 8 |
|---|---|---|---|---|---|
| 8 | 8 | 6 | 6 | 8 | 8 |
| 8 | 8 | 6 | 6 | 8 | 8 |
| 8 | 8 | 6 | 6 | 8 | 8 |
| 8 | 8 | 6 | 6 | 8 | 8 |
| 8 | 8 | 6 | 6 | 8 | 8 |
| 8 | 8 | 6 | 6 | 8 | 8 |
| 8 | 8 | 6 | 6 | 8 | 8 |
| 8 | 8 | 6 | 6 | 8 | 8 |

FIG. 12.

| 6 | 5 | 1 | 1 | 5 | 6 |
|---|---|---|---|---|---|
| 6 | 5 | 1 | 1 | 5 | 6 |
| 6 | 5 | 1 | 1 | 5 | 6 |
| 6 | 5 | 1 | 1 | 5 | 6 |
| 6 | 5 | 1 | 1 | 5 | 6 |
| 6 | 5 | 1 | 1 | 5 | 6 |
| 6 | 5 | 1 | 1 | 5 | 6 |
| 6 | 5 | 1 | 1 | 5 | 6 |
| 6 | 5 | 1 | 1 | 5 | 6 |

FIG. 13.

|  | 0 | 2 | 3 | 0 | -2 | -3 | 0 | -2 | -3 | 0 | 2 | 3 |  |
|---|---|---|---|---|---|---|---|---|---|---|---|---|---|
|  | 0 | 2 | 3 | 0 | -2 | -3 | 0 | -2 | -3 | 0 | 2 | 3 |  |
|  | 0 | 2 | 3 | 0 | -2 | -3 | 0 | -2 | -3 | 0 | 2 | 3 |  |
|  | 0 | 2 | 3 | 0 | -2 | -3 | 0 | -2 | -3 | 0 | 2 | 3 |  |
|  | 0 | 2 | 3 | 0 | -2 | -3 | 0 | -2 | -3 | 0 | 2 | 3 |  |
|  | 0 | 2 | 3 | 0 | -2 | -3 | 0 | -2 | -3 | 0 | 2 | 3 |  |
|  | 0 | 2 | 3 | 0 | -2 | -3 | 0 | -2 | -3 | 0 | 2 | 3 |  |
|  | 0 | 2 | 3 | 0 | -2 | -3 | 0 | -2 | -3 | 0 | 2 | 3 |  |
|  | 0 | 2 | 3 | 0 | -2 | -3 | 0 | -2 | -3 | 0 | 2 | 3 |  |

UNIVERSAL FOCUS MULTIPLANAR CAMERA

The invention described produces photographic images that are in-focus at all distances.

Conventional cameras and other optical devices produce images on one plane only. Objects at differing ranges from the lens of the instrument cannot appear in-focus on that one single plane simultaneously. The viewer is required to choose one object of interest at one specific range setting, and other objects at other ranges will be blurred, out-of-focus.

This invention divides the image from the lens system into vertical and horizontal co-ordinates, and splits the image into two or more parts, each part being caused to fall upon separate viewing planes at different distances from the lens.

The blurred sections at each viewing plane are eliminated and the remaining sections of each plane, that are in-focus, are reconstituted to form a single composite image wholly in-focus.

A further mechanism may enable the original single image to be considered on a co-ordinate by co-ordinate basis, and to be modified mathmatically to produce an image that in the opinion of the operator is in-focus.

The images described may be produced from any camera or optical instrument, for observation or recording on film, or electronically, in still form or motion, in real time or delayed and recorded.

Photographic images from earliest times have been concerned with the production of a record of an object. Literature regarding the operation of cameras of all types is consistent in that all seek to demonstrate how the details of an object are transmitted through a lens system and recorded upon a sensitive screen or film on the other side of the lens.

Much of the optical description is drawn from even earlier texts on telescopes and microscopes, and the lens is indeed often called "the objective".

All mechanisms are described in terms of how they will deal with recording "*the* object"; very noticably one, single, object.

The art of photography has followed this science of photography from the early still picture, to motion pictures, colour pictures and, most recently, television pictures. The motion picture industry followed the portrait photographer in establishing a "star" system, wherein story, dialogue and action centered about one person; the star, the photographic object.

A photographic scene however differs radically from an astronomical scene in one particular respect that is often ignored. Outside of the contrived portrait studio, where background and foreground of a photograph can be eliminated, there must always exist in nature objects within the field of view of the lens system that are nearer or further from the lens than the "star" object itself.

Any lens system can only produce a truly focussed image on a fixed sensitive screen of an object at a certain precise distance before it. There is a precise mathmatical relationship between distances from object to lens to screen.

Figure 1A:
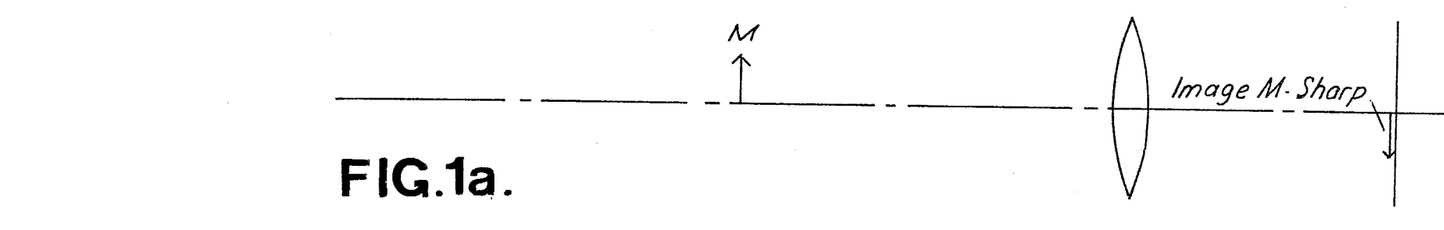
FIG. 1 shows the image obtained by a conventional single planar camera.
Figure 1B:
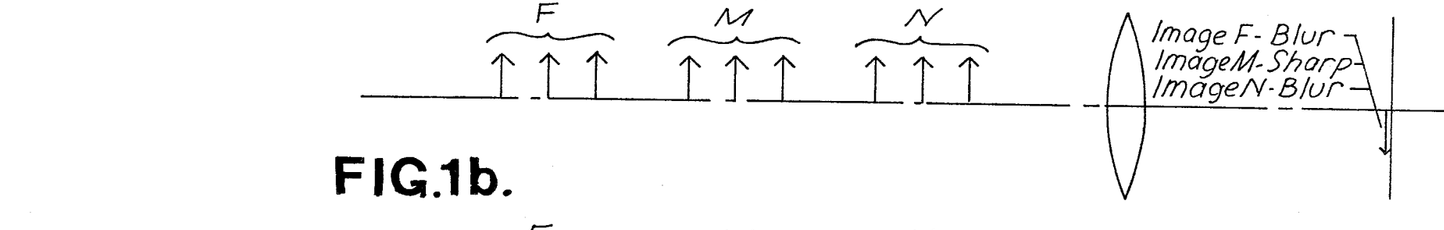

It follows that any secondary object at ranges other than the traditional single object will, in a photograph, appear blurred to the viewer of the screen, even when all objects and the lens and the screen are absolutely motionless. (FIG. 1)

"Blur" is a phenomenon unique to photographic images. It is not observed by the normal healthy human eye when looking at views, and indeed cannot be reproduced in the eye even when a scene is observed through a lens such as a camera lens. The eye only comprehends "blur" when the light gathered by a lens is intercepted by a viewing screen. It is the object of all these inventions to reduce this deficiency.

It is necessary with traditional cameras and optical devices, therefore, for the photographers to decide upon their most important single, "star", object, and contrive to have it in focus, accepting that all other objects in view, other than those at the same range as the "star", will be blurred to greater or lesser degree.

Where the degree of blur is such as to be objectionable or irritating to the observer, it is usual for the skilled photographer to so compose the field of view that such items are minimised or eliminated. Nevertheless often the most skilled photographer, and certainly the amateur without time to compose, must often include out-of-focus objects within his picture in order to capture the "star" object.

Long time acceptance of this restriction has given rise to the concept that such blurred secondary objects are a necessary and indeed vital artistic component of the finished photographic work. This is not so. Blurred secondary objects are a restriction stemming from the fixed mathmatical properties of a lens system, and this invention relates to means for overcoming this restriction and presenting the viewer with a photograph of all objects at all ranges all in focus if he so desires.

Note. Many range finding mechanisms exist for setting a camera lens automatically to produce an in-focus photograph of an object. All such systems require the photographer to make a prior subjective decision as to what the "star" object, out of all those in view, will be. No rangefinder can make such a decision, they can only set the camera to focus upon the chosen "star", and the remainder of the scene will, by definition, be out of focus if it does not lie at the same range.

Figure 3:
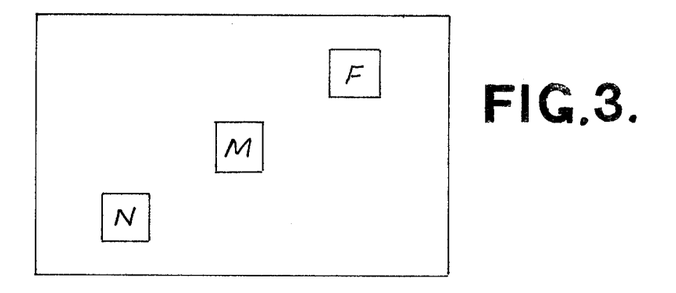
FIG. 3 shows three objects as imaged by a human eye.

FIG. 3 shows three similar objects of equal interest at three different ranges from the camera lens, as they would appear to an observer whose eye was at the place of that lens. Except in such contrived cases as those that have all three objects within the "depth of field" of the camera lens, it is impossible for a camera to capture a photographic image of all three objects in sharp focus on the same frame.

Figure 5:
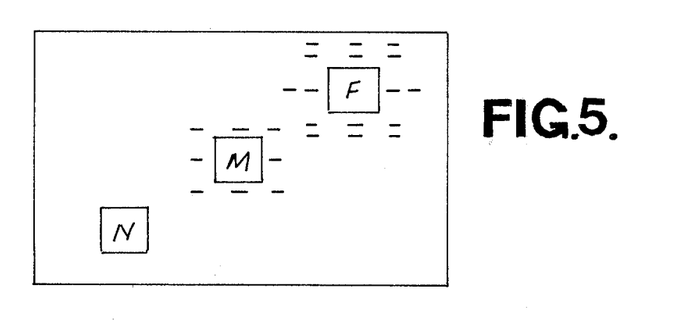
FIG. 5 shows the image of FIG. 3 as recorded by a camera focused on a middle range object.

FIG. 5 shows the usual photographic compromise solution; the centre object, the "star", is caused to be in sharp focus, while the left hand object, being closer to the camera than the star, has a degree of positive blur to its edges and other detail, and the right hand object, being further from the camera than the star, has a degree of negative blur.

Figure 6:
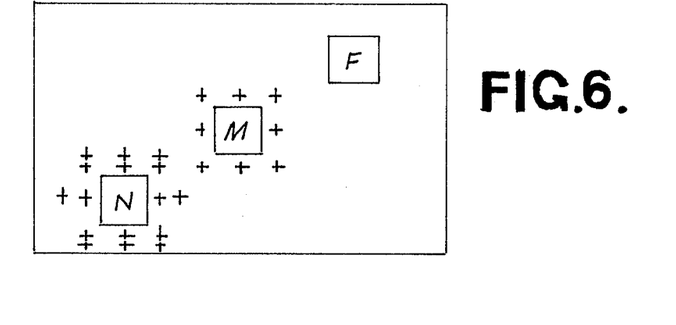
FIG. 6 shows the image of FIG. 3 recorded by a camera focused on a for range object.

Another photographer faced with the same scene may however choose to treat it as in FIG. 6. Here the right hand object is in focus, and the centre object has a degree of positive blur, while the left hand object is then obliged to have two degrees of positive blur.

Figure 4:
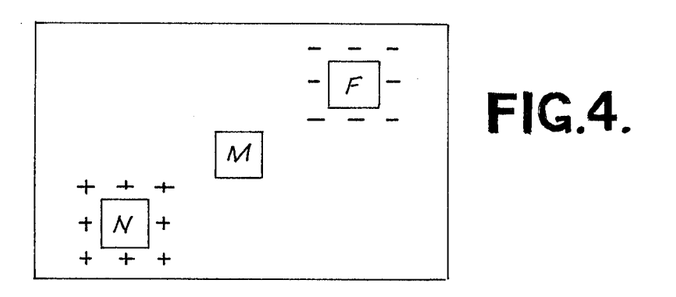
FIG. 4 shows the image of FIG. 3 as recorded by a camera focused on a near range object.

Similarly, if a third photographer were to choose the left hand object as his star, then as in FIG. 4 the centre object would take a degree of negative blur and the right hand object two degrees of negative blur.

Any photographer therefore, and any form of rangefinder mechanism known, is bound to select one final photograph from either, FIG. 4 or 5 or 6.

It is the object of the invention described below to capture high definition photographic mathmatical/optical information from two or more separate ranges of any single field of view observed through the same single objective lens system.

Figure 2:
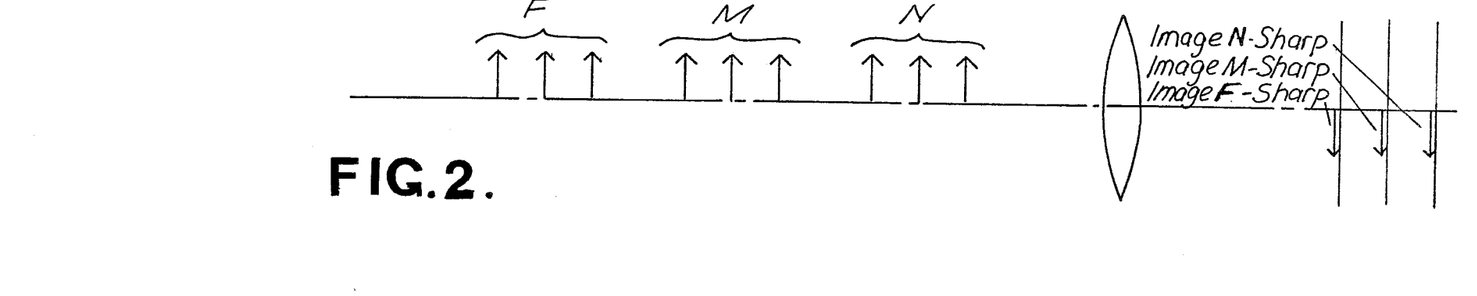
FIG. 2 shows the image obtained by a multi planar camera.

The operation of such a camera, with respect to FIGS. 4, 5 and 6 would capture three entirely different sets of information on three separate focal planes set at three different distances from the same lens system. Each plane is exposed separately; one would capture FIG. 4 another FIG. 5 and the third FIG. 6. (see FIG. 2)

The information on each plane would be a full traditional photograph of the whole scene, differing only in respect of the degree of blur surrounding the various objects. During any exposure period the plane being exposed is not in motion.

Described below is a means for eliminating from such photographs those areas of the whole scene that are out of focus. For example, if the primary object of a scene was the face of a person at one meter from the camera, and the background a range of mountains at ten kilometers from the camera, the face would be in focus, and the mountains blurred. After processing by this invention a photographic image would be produced of the face only, the whole of the mountain range having been eliminated, by no other criteria than that it was at a different distance from the camera than the face.

In the example above, it would be possible with the multiplanar camera to take a second simultaneous photograph in which the mountain range was in focus and the face out of focus. After processing by the invention, the second photograph would show only the mountain range, the face being eliminated.

By combining the two partial in-focus photographs, face from one and mountain range from the second, a final full picture of in-focus face and in-focus mountain background would appear.

Means exist for the view on each separate plane to be recorded photographically or by video. Given sufficient time and skill a composite could be built up of each individual frame, from the in-focus areas of each plane, to show only those areas, in the final projection. It is doubtful that an acceptable motion picture on film or television could be produced in this manual fashion, and the time required is many hundreds of times the duration of the finished production.

Means of eliminating the out-of-focus areas from each individual plane within a period of time of a similar magnitude to the exposure time of the camera i.e. between ten seconds and tenmicroseconds are described below.

The operation of the cameras described will allow a moving "star" object or person to be photographed against a background and foreground that are all equally in focus at all times.

In conventional motion pictures and television, motion is achieved by presenting the eye with consecutive single photographs at a rate of about 1/50 second. Each single photograph is comparable with a conventional still photograph, and the exposure time is also about 1/50 second.

Since each separate photograph, or "frame" of a motion picture is produced by a lens system focussed on a certain "star" object, it follows that the motion picture will suffer the same out-of-focus secondary objects as were described above.

A multi planar motion picture or television camera takes two or more simultaneous pictures during the time period of one "frame" via a single objective lens system. The only difference between the two or more pictures is that by virtue of the focal planes being at different distances from the lens system, each picture is focussed upon objects at different ranges from the camera.

During the time period of one "frame", none of the separate focal planes moves relative to the lens system.

The human eye cannot discern small degrees of blur in an image, thus each focal plane will in fact cover a number of different ranges, within what is conventionally termed the "depth of focus".

A further embodiment of this invention is a means for adjusting the position of one focal plane relative to another, and relative to the lens system, so that three "star" objects can be held to be continually within the three separate "depths of focus" of the individual planes. Nevertheless, during the time period of one "frame exposure", none of the focal planes moves relative to the lens system.

The purpose of the items described below is to reconstitute the out of focus areas of the photograph i.e. those objects that lie closer or further from the camera than the primary object, and present them to the viewer apparently in-focus.

The process is concerned with the mathmatical composition of the photograph. The invention analyses that part of the photograph which, in the opinion of an operator, is in best focus. The operator then applies the invention to sections of the photograph that are slightly blurred, and analyses those in a mathmatical form. It has been found that such an analysis will produce different answers for identical objects if they are at different distances from the camera. Knowing the mathmatical composition of the in-focus object, mathmatical equations may be applied to the answers from the out of focus sections, so as to produce answers that are those that would have been obtained from the camera had the camera been focussed upon secondary objects.

The resultant photograph will be enhanced in that all objects at all ranges will be in focus irrespective of the distance between the camera lens, the objects and the focal plane of the camera at the moment of viewing.

Items described below for use in motion picture or television photography are concerned with the enhancement of moving photographs that are blurred in some areas due to the necessity for requiring a traditional camera to be aimed and focussed upon a single distance from the camera.

There may be any number of monitoring screens upon which the operator may project identical images of the single view being captured by the motion picture film or television camera.

If there are nine monitors, the operation is as follows. By use of the processor described below all objects other than objects in focus are eliminated from monitor No. 1. (the remainder of that monitor is blank.)

Objects forming the background are enhanced in monitor No. 2., and all other objects, including those showing on monitor No. 1 are eliminated from monitor No. 2.

In the same way objects at different ranges are projected and enhanced on monitors No. 3–8, such that those monitors show only in-focus objects, enhanced by the subjective intervention of the operator or wholly on a mathmatical basis derived from the characteristics of the original in-focus areas of monitor No. 1.

A final in-focus interpretation of the original scene is projected by combining the items from each monitor into one composite picture.

Figure 7:
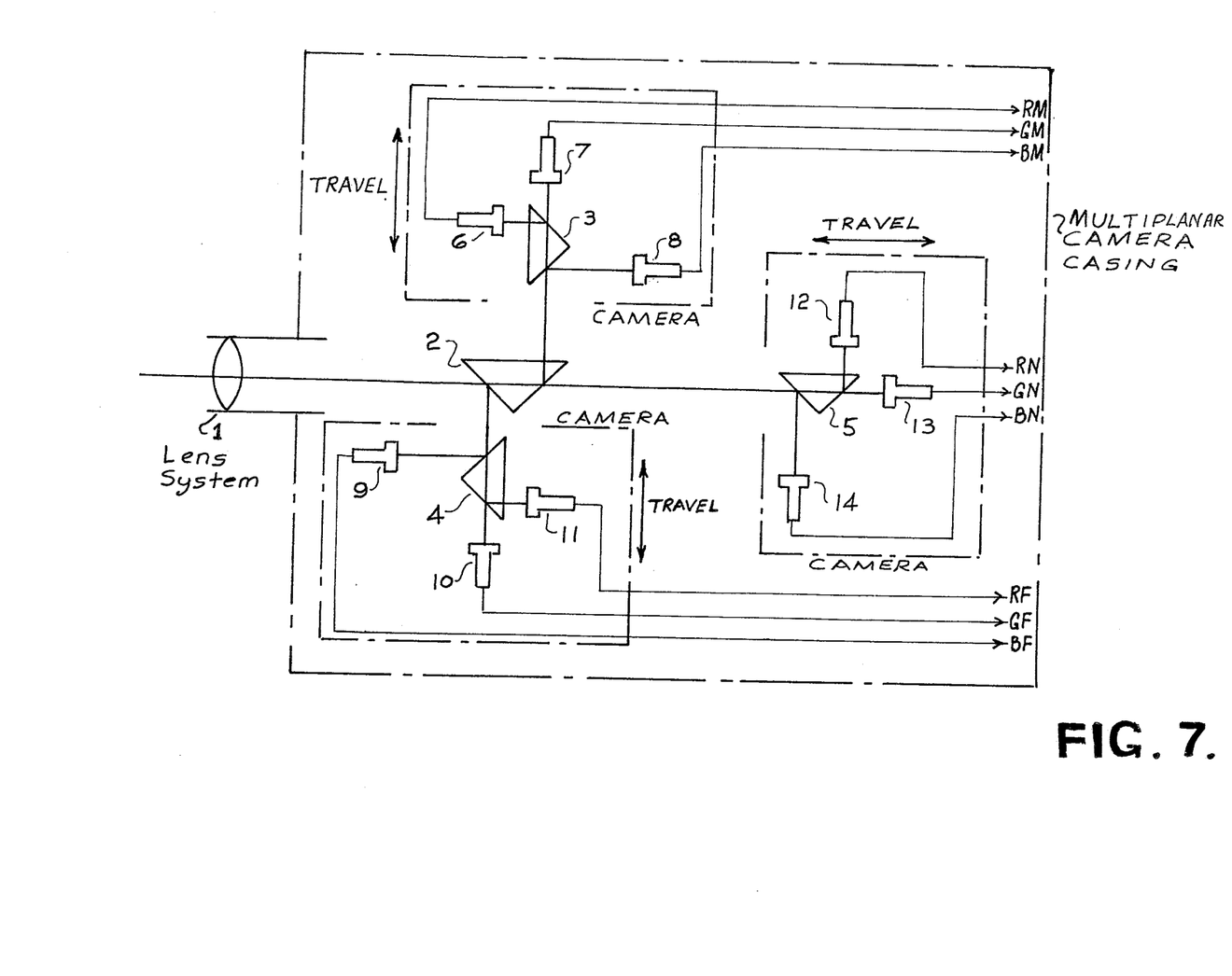
FIG. 7 is schematic drawing of a multi planar color television camera.

A camera for the production of television pictures is shown in FIG. 7. The conventional lens system L is directed at the scene to be recorded, and the light so gathered is split into two or more parts by the Prism $P_x$.

The split light is caused to fall upon three separate monochrome or colour television cameras, placed at three different distances from Prism $P_x$. Shown here each part falls upon a three tube television camera, with its own prism system, $P^+$, $P^°$, and $P^-$, corresponding to $S^+$, $S^°$, and $S^-$. (FIG. 7)

Prism $P^°$ in conjunction with a system of colour filters and mirrors $F_R^°$, $F_G^°$ and $F_B^°$ produces in-focus images of objects in the middle distance from the camera, in red, green and blue on television tubes $T_3$, $T_1$ and $T_2$ respectively, i.e. $S^°$.

Similarly Prism $P^+$ produces in-focus images of objects in the far distance from the camera, in red, green and blue on television tubes $T_7$, $T_9$ and $T_8$ respectively, i.e. $S^+$.

Prism $P^-$ produces in-focus images of objects in the near distance from the camera, in red, green and blue on television tubes $T_6$, $T_4$ and $T_5$ respectively, i.e. $S^-$.

All three sets of red, green and blue signals are then fed via delay circuits to a switching network that switches inputs from that channel in best focus to the final single output channel for conventional transmission or recording.

Figure 8:
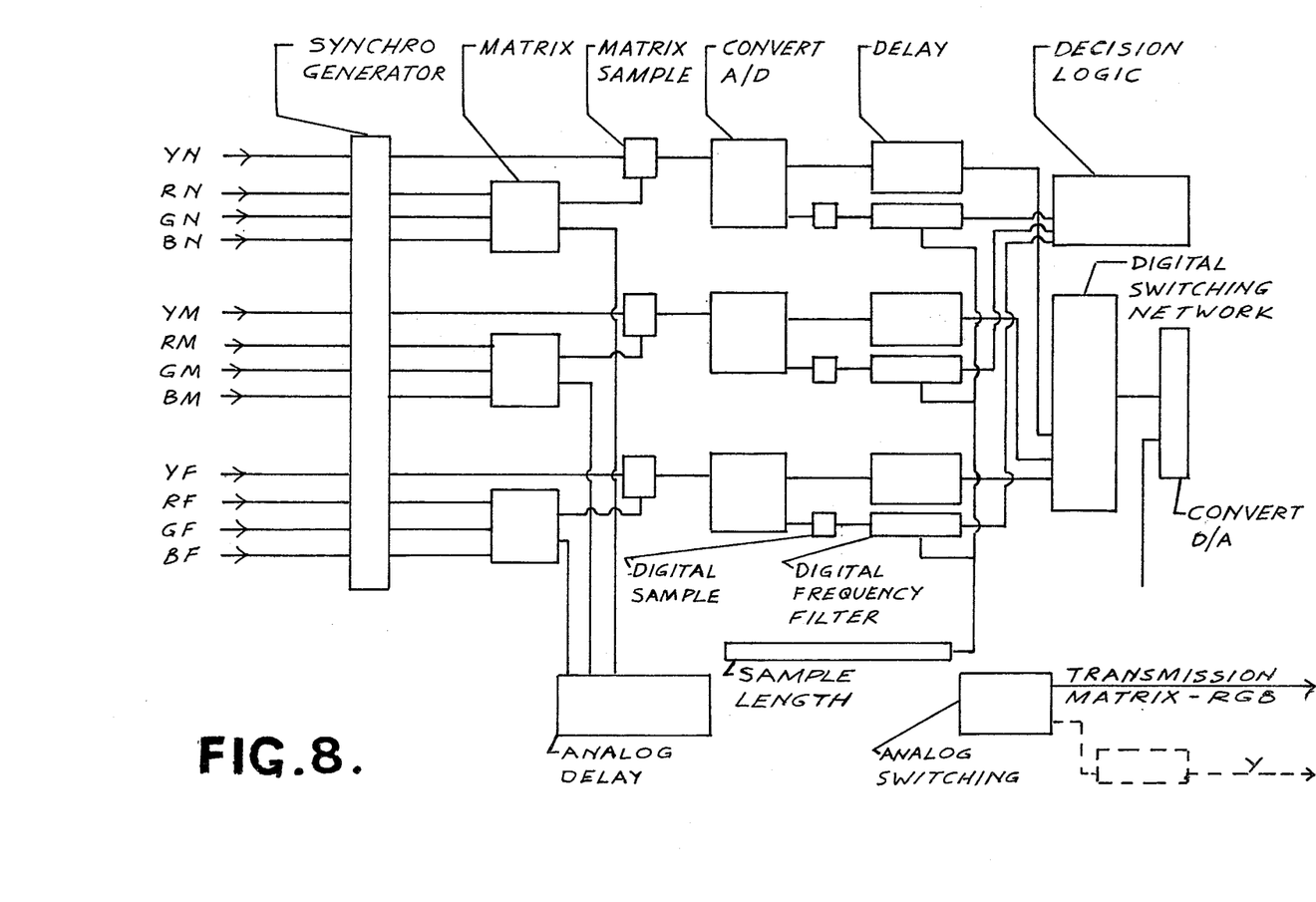
FIG. 8 is a schematic drawing of a selection system for obtaining universal multi planar focus.

During the delay period the following selection process takes place. (FIG. 8) Associated with each of the three input channels is a luminence input $Y^+$, $Y^°$ and $Y^-$. This may be provided as a separate input from the RGB signals or derived from them. The Y signals are then digitised and passed through a filter and selector.

Figure 9:
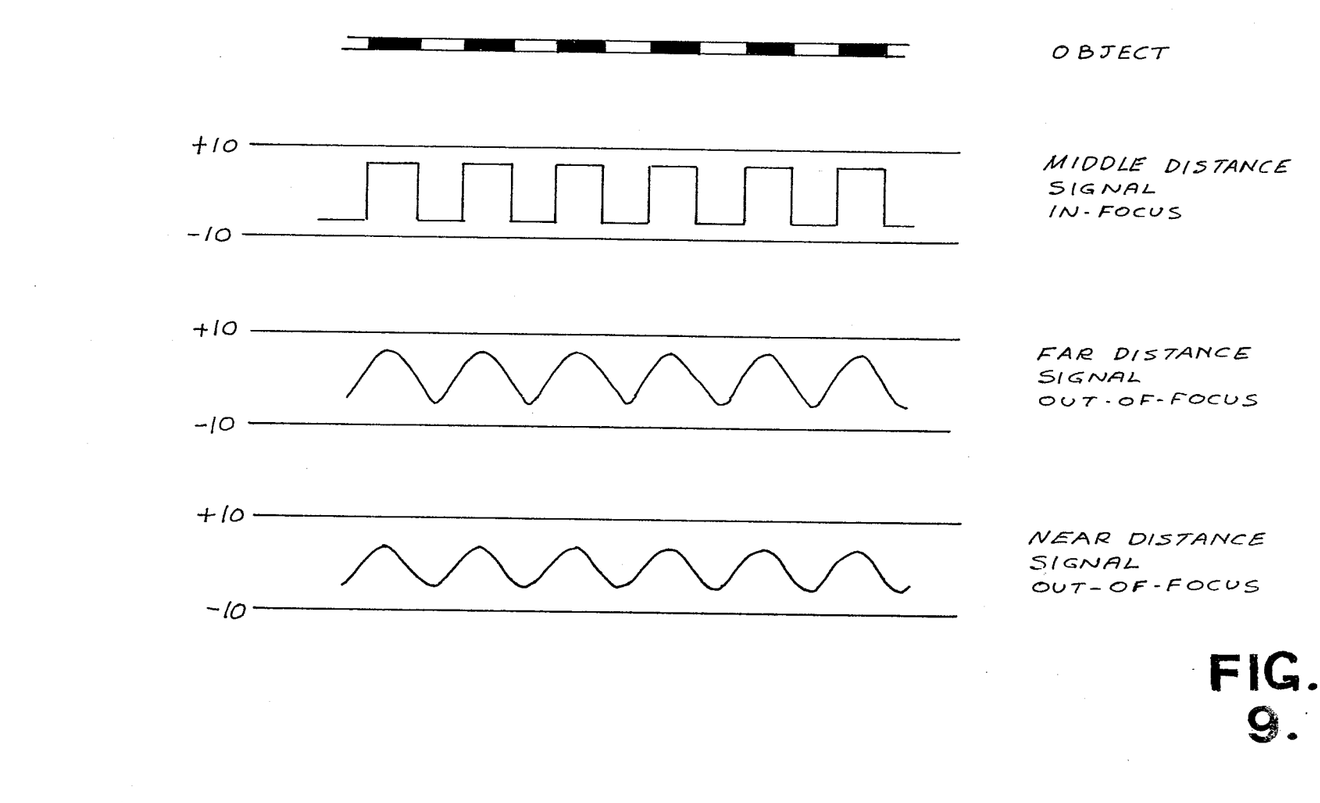
FIG. 9 is a diagram of focussed and out of focus pictures.

FIG. 9 shows the video luminence waveforms obtained from two cameras scanning an image of black & white bars set at different focus. The signal risetime for a focussed camera is faster than for an unfocussed camera.

The digital filter may operate on any chosen number of points and on a single line or two or more lines as follows. A frame of a television picture consists of horizontal lines of light, separated by lines of darkness. The lines of light vary in shade across the frame, but the dark separating line is constant intensity. There are various numbers of lines in common use, 525 and 625 lines per frame for example, and this invention applies to all.

Each line of light in it's turn may be considered as being further divided across the width of the frame into, say, a further 625 points. Thus in conjunction with a basic 625 line system, 390,625 points per frame will be established. Completed once every 50th second, this will give a point sampling rate of 19,531,250 per second, i.e. 20 MHz.

Each point may have it's position on the screen located by a particular number between say, 000001 at the top left hand corner down to 390625 at the bottom right hand corner. The characteristics of each point may then be described on a scale varying from 1 to 9, or on a 5-bit scale varying from 00001 to 99999, or on an eight-bit scale varying from 00000001 to 99999999, depending upon the sensitivity of the system.

Figure 10:
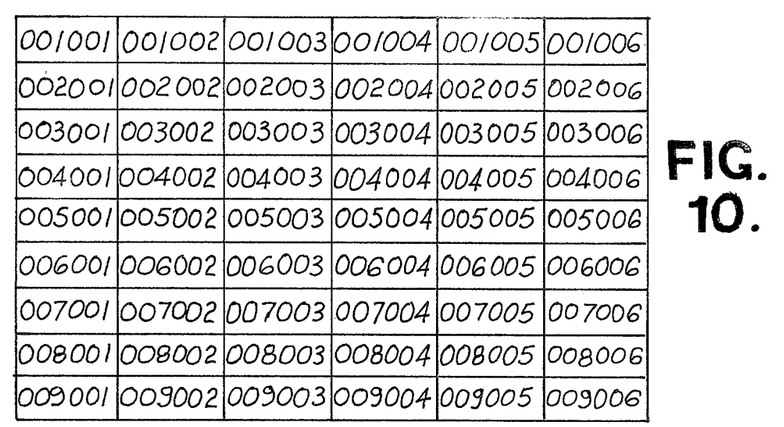
FIGS. 10 to 13 show tables of numerical values associated with the color television camera of FIG. 7.
Figure 11:
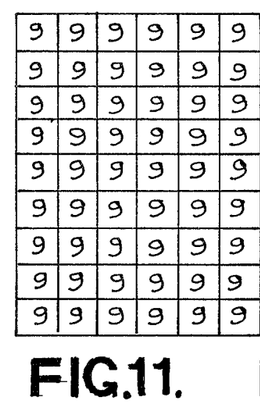
Figure 12:
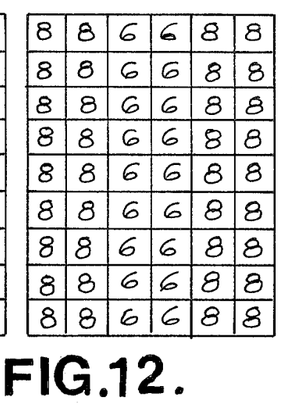
Figure 13:
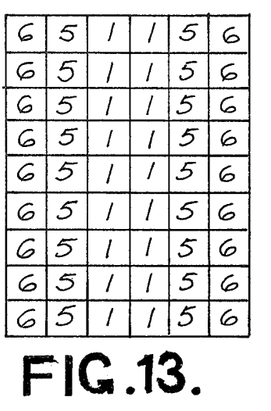

Part of one frame of information is shown on FIG. 10. A possible set of 1-bit characteristics for each of the points shown for each of three channells $S^+$, $S^°$ and $S^-$ are shown. (FIGS. 11, 12 and 13.)

A single line analysis of point 003004, for example would compare the rate of change between points 003003 and 003005 in each channel, and since in this case channel $S^+$(FIG. 11) has the greatest rate of change, channel $S^+$ would be in best focus and therefore channel $S^+$ would be transmitted.

An improved selection process would be to compare the rate of change over points 003001 and 003007, showing again that point 003 004 taken from channel $S^+$ should be transmitted.

An even more selective method of analysis is to compare the nine points

| 002003 | 002004 | 002005 |
| 003003 | 003004 | 003005 |
| 004003 | 004004 | 004005 | for each channel $S^+{}_1$, $S^°$ and $S^-$. on the following basis:

If the above points are represented on a 1-bit basis then they could be set down thus for each channel separately:

| a | b | c |
| d | p | e |
| f | g | h | and the spatial frequency would be given by the expression $$8p - (a+b+c+d+e+f+g+h)$$

The channel with the highest resulting number would be the one to be transmitted.

Where a motion picture film record is required the final composite television signal may be converted into a film record by conventional tape-to-film methods, or the following may be used.

Figure 14:
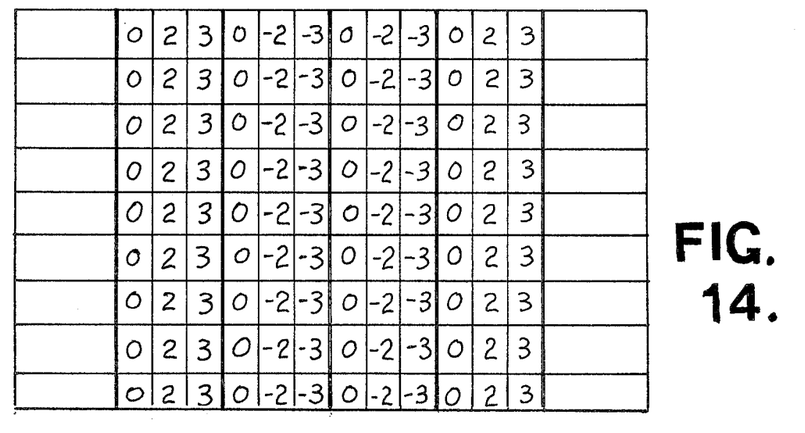
FIG. 14 is a schematic drawing of a multi planar motion picture camera.

FIG. 14 shows the light gathered from lens system L split into two parts. One part falls upon a set of monochrome television tubes, or colour tubes, producing signals $T^+$, $T°$ and $T^-$ that are processed to select in-focus areas as above, and the other part falls onto cine film cameras $C^+$, $C°$ and $C^-$.

During the normal processing of the three films $C^+$, $C°$ and $C^-$ those parts of each film that are not in focus are obliterated from each frame of each film according to the signals from the compared television channels. The three films, with the blurred sections washed-out of each, are then combined to form a single master film, in much the same way as traditional animation techniques.

Figure 15A:
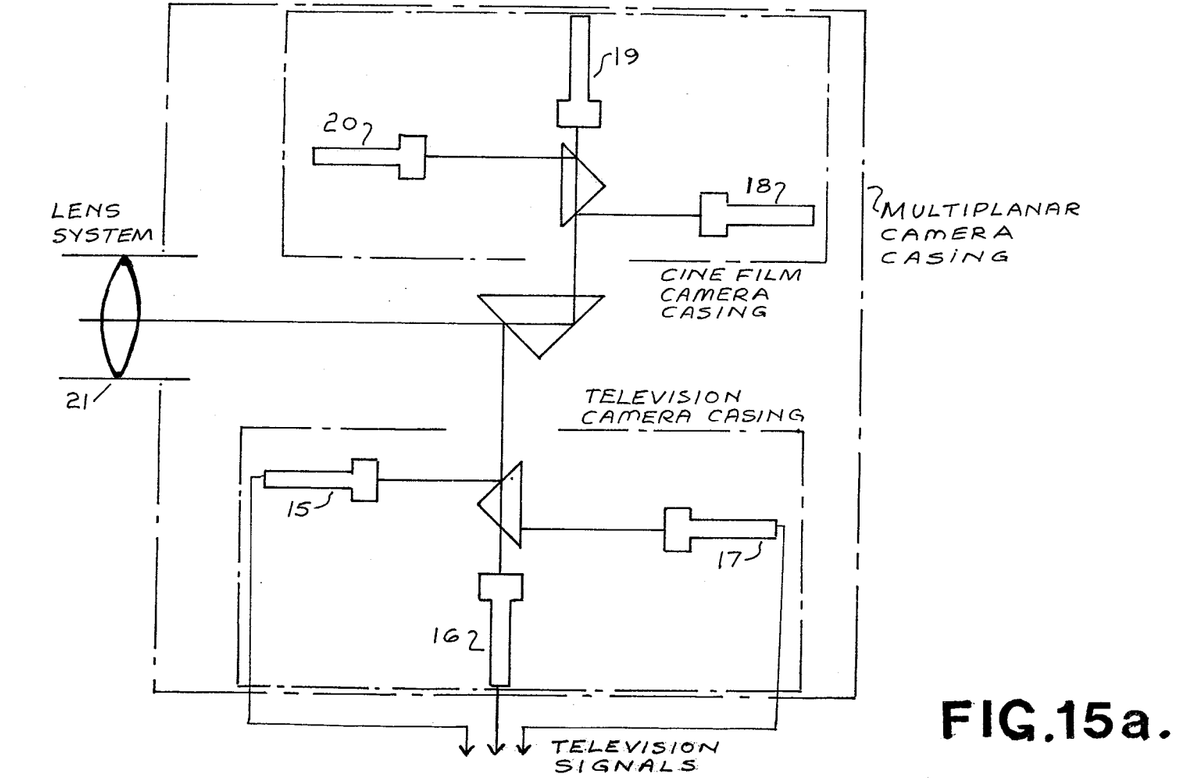
FIG. 15 is a detail drawing of a multi planar television camera.
Figure 15B:
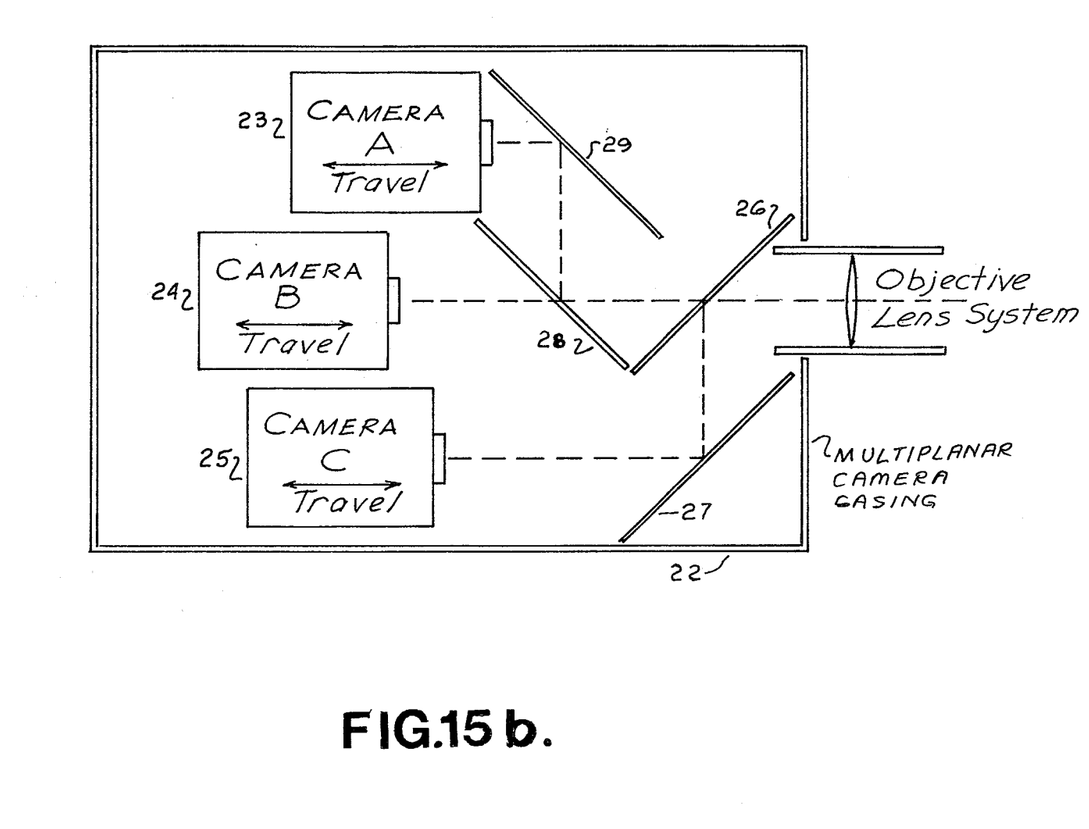

FIG. 15 shows a camera head for use in the television camera system. Three identical colour television cameras, with identical lenses, are locked together in a light proof casing with an open front. The focal planes of each camera are capable of being adjusted so that each camera may be brought to focus upon a different distance from the front of the composite camera casing.

Light from the scene viewed enters the camera through a transparent cover, and strikes two-way mirror B1. Light reflected passes to mirror C and thus to camera C. Light passing through B1 moves to two-way mirror B2. Light reflected by B2 moves to camera A by way of mirror A, while light passing through B2 moves to camera B.

Prisms and two-way prisms may be substituted for mirrors and two-way mirrors in all cases.

Figure 16:
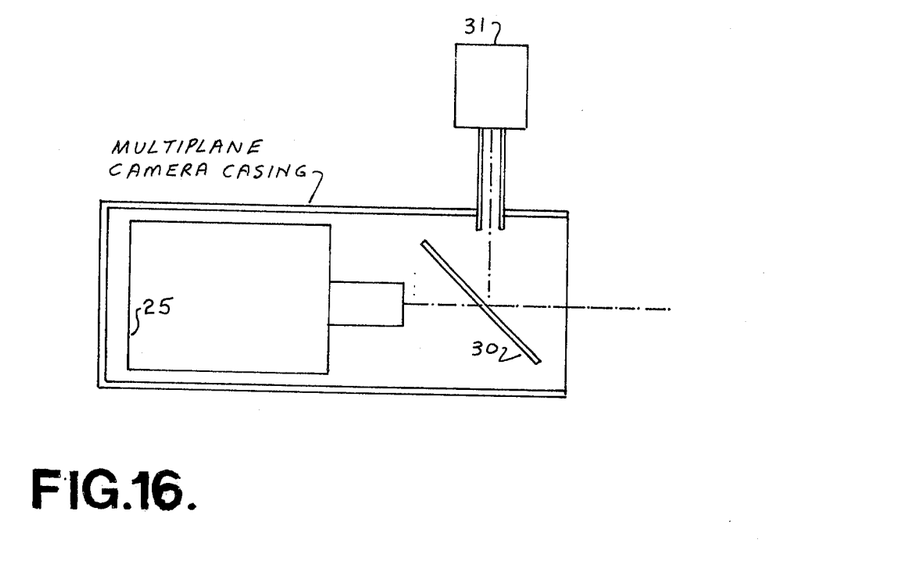
FIG. 16 is a detail drawing of a multi planar motion picture camera.

For colour film operation the setting out of three colour film cameras is as FIG. 15 but an additional video camera T is placed in such a position that (FIG. 16) an additional two way mirror or prism t will reflect part of the original image into camera T. Camera T contains three tubes with focal planes set to correspond to film cameras A, B and C.

Cameras A, B and C may be in fixed positions relative to the outer casing and each other, or may be moved during the course of a motion picture by the manual or automatic control of the photographer.

Video tape recorder techniques may be used to replace the delay circuits described above as follows. The three groups of RGB signals are combined to produce three conventional colour television signals such that
$R^+ + G^+ + B^+ = C^+$: $R° + G° + B° = C°$: $R^- + G^- + B^- = C^-$:

Signals $C^+$, $C°$ and $C^-$ are then recorded on three separate video tape systems, synchronised as to time. Duplicate tapes $CA^+$, $CA°$ and $CA^-$ are produced from $C^+$, $C°$ and $C^-$ respectively. Tapes $CA^+$ and $CA°$ are then played back together through a switching and selecting system as described in above such that focussed sections of $CA^+$ erase blurred sections of $CA°$ and vice versa. Similarly $CA^+$ and $CA^-$ are played together and processed and finally $CA°$ and $CA^-$ are played together and processed.

After the procedure described in above, three tapes will remain, $F^+$, $F°$ and $F^-$ in which only the focussed sections of tapes $CA^+$, $CA°$ and $CA^-$ will remain, the remainder of each frame being blank.

For final transmission and viewing, tapes $F^+$, $F°$ and $F^-$ shall be played simultaneously.

For cine film production each tape $F^+$, $F°$ and $F^-$ is used to produce black and white cine films $H^+$, $H°$ and $H^-$.

The focussed sections of film $H^+$ are wholly transparent while the blurred sections of film $H^+$ are wholly black. Similarly with films $H°$ and $H^-$ i.e. the three H films are silhouettes.

Applying films $H^+$, $H°$ and $H^-$ to films $C^+$, $C°$ and $C^-$ above will produce three further films that, when combined, will have all sections in focus.

Alternatively tapes $F^+$, $F°$ and $F^-$ may be transformed into film by conventional processes, and the three partial films so produced be combined to form a single film all parts of which are in focus.

Figure 17:
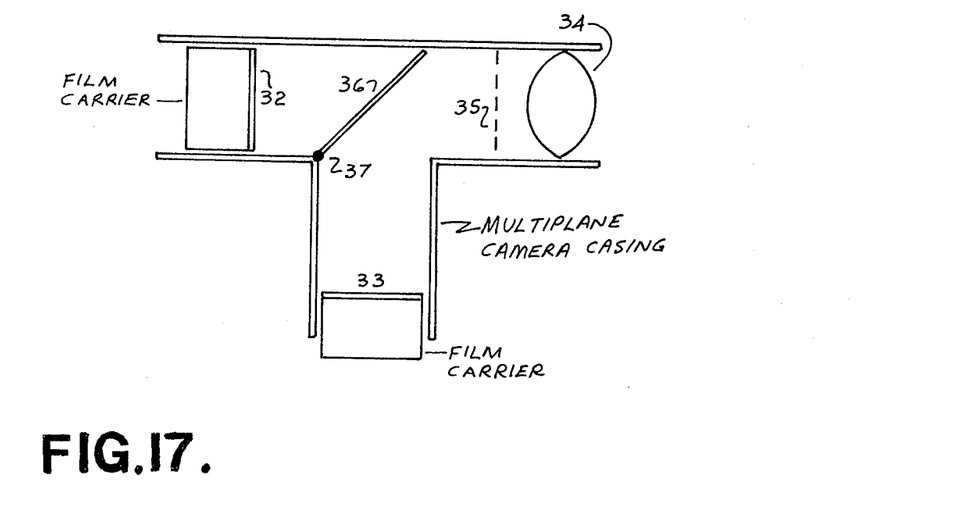
FIG. 17 is a detail drawing of a multi planar still film camera.

FIG. 17 shows a two plane camera for taking single photographs. A third plane may be incorporated above plane F1, to produce a triple plane camera, and any number of additional planes may be introduced to form a multiplane camera.

Lens, diaphragm D and film support plane F1 are built into a rigid camera body as in a conventional camera except that film support plane F1 is contrived to be at right-angles to the lens, by means of a mirror or prism M.

Behind mirror M, and hidden from the lens in the initial position of the camera operation, is a second film support plane F2. A film F2 is mounted in a separate section of the camera body, such that film F2 is free to move relative to the lens position.

The operation of the camera is as follows:

a. The camera is aimed at a scene containing background and foreground objects of equal interest. Film F1 is supported at film plane F1 such that it will record a sharp image of all those objects contained in a 'depth of focus' between infinity and a depth of focus distance closer to the camera.

b. The position of film support plane F2 is adjusted by the photographer so that film F2 will record a sharp image of those objects that are close to the camera, but too close to be sharply defined on film F1.

c. Aperture of diaphragm and shutter speed will be set as with a conventional camera.

d. The camera wil be operated, taking a conventional picture on film F1. Immediately following this, however, and as part of the same operation, the following will occur.

e. Mirror M, hinged at H, swings down to cover film F1.

f. The shutter acts for a second time, taking a separate picture on film F2.

Both films are then processed conventionally, and the out of focus sections of each erased by electronic selection as described earlier. The focussed sections of each film remaining are then combined into one final complete in focus picture for printing or projection in conventional ways.

The shutter mechanism may be replaced or supplemented by a shutter at plane F1 and plane F2. The diaphram may be replaced or supplemented by a diaphragm at plane F1 or plane F2. Film F2 may be mounted in an adjustable sliding lightproof system using blinds or bellows. Film F1 may be adjustable in position as film F2.

Either or both films may be mounted so as to move in all other planes relative to the lens, or each other, in addition to the backward/forward movement described above.

Rangefinding for either F1 or F2 or both may be by direct measurement, parallax methods or reflex or electronic methods as with conventional cameras.

The digital filter mechanism as described above may be used to modify one or more of the three multiplane images or to enhance a picture taken with a conventional single plane single lens camera; the following describes the process for enhancing a single photograph or a single frame of a motion picture or television signal.

The image is scanned and divided into say 390625 points as before. Groups of points, in line or in sets of lines are then considered, for example:

| 002007 | 002008 | 002009 | 002010 |
| 003007 | 003008 | 003009 | 003010 |
| 004007 | 004008 | 004009 | 004010 | the numeral values of each point in any given scene could be represented by

| a | b | c | k |
| d | e | f | l |
| g | h | j | m | and the spacial frequency of point 003008 would be $$e' = 8e - (a+b+c+d+f+g+h+j)$$

and the spacial frequency of point 003009 would be $$f' = 8f - (b+c+k+e+l+h+j+m)$$

Figure 18:
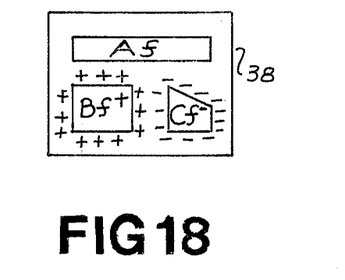
FIG. 18 shows an image which is partially focused.

FIG. 18 shows an image in which object A is in focus (Af), object B is out of focus (Bf+) and object C is out of focus in a different way from B (Cf−).

An editing machine consisting of a screen for viewing the whole original scene as photographed, plus two or more monitor screens and a final image screen is shown in FIGS. 18-21.

Figure 19:
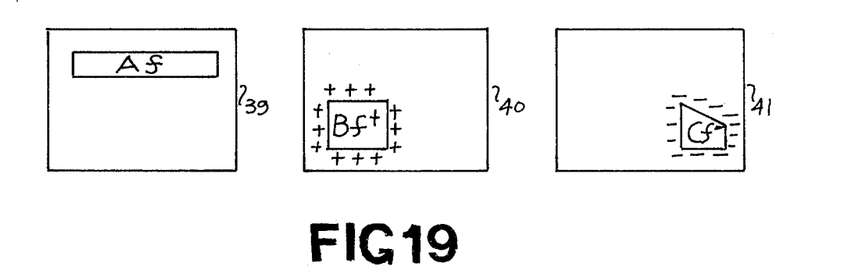
FIGS. 19 and 20 show monitors for facilitating focusing of the FIG. 18 image.
Figure 20:
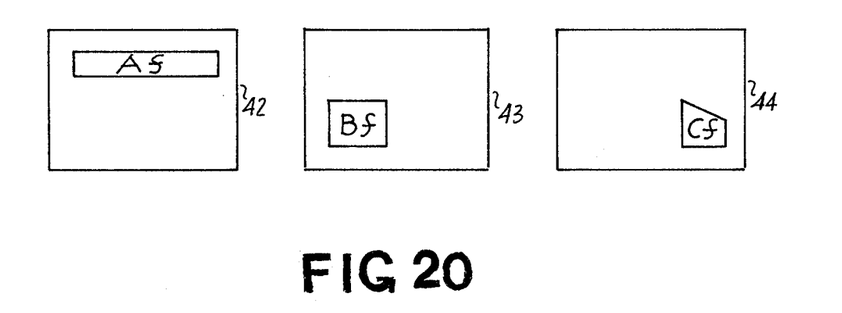

All picture points with a spacial frequency value of 9 or more (on a one bit basis) are switched to appear on Monitor 1. All points with values between 4 and 8 are switched to appear on monitor 2. All points with values less than 4 are switched to appear on Monitor 3.

Using suitable delay circuits, each monitor will show parts of the scene with three separate grades of focus. Object A will appear on Monitor 1, surrounded by a dark area, Object B will appear on Monitor 2, surrounded by a dark area, and Object C will appear on Monitor 3.

Figure 21:
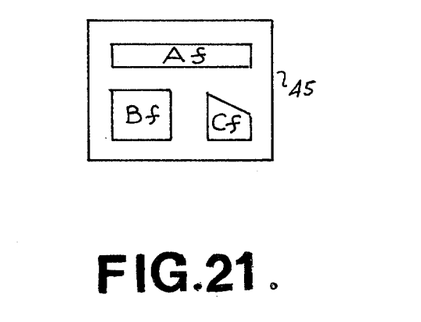
FIG. 21 shows the FIG. 18 image in universal focus.

If the operator of the editing device wishes to present a final fully focussed scene on transmission screen S, he will select Monitor 1 for direct transmission and Object A.

The operator will then consider the numerical value of the spacial frequency of each point making up the blurred image on Monitor 2, and by subjective decision, multiply those numbers by a suitable mathmatical, constant such that the picture then appearing on Monitor 2 is correctly in focus. Where the characteristics of the original camera are known, the operator's subjective opinion may be replaced with constants derived from the camera characteristics.

Similarly, but by the application of different multipliers, the image on Monitor 3 may be brought to acceptable focus.

Passing the signals from Monitor 1 and Monitor 2, after mathmatical enhancement, will produce a picture in full focus on screen S, for transmission or recording in conventional ways.

While three monitors are shown here, nine monitors would give higher definition and similarly, while one-bit numbers have been used to illustrate the principle, nine-bit or more would be suitable for full colour television or cine film projection.

The use of the editor gives the operator control as to the degree of blur in any section of the image i.e. blurred areas may be made sharp and sharp areas may be made blurred. The delay circuits may be varied from a time suitable for viewing one frame (say 1/50 second) to many minutes, hours or days according to the time needed for the operators decision processes.

I claim:

1. In a single camera or optical device a means for causing the image formed by the single conventional lens system of that camera or device to be divided into two or more whole sub-images, each sub-image falling upon a different plane at the same instant of time, and with each plane purposely moved to be at a different distance from the lens system and any of the other planes at that instant, for producing finished still or motion pictures or continuous television signals of each sub-image so formed at each different plane, such that those pictures or signals differ only as to the sharpness of focus of different objects at different ranges from the single objective lens system.

2. In a single camera or optical device a means for causing the image formed by the single conventional lens system of that camera or device to be divided into two or more whole sub-images, each sub-image falling upon a different plane consecutively, and with each plane purposely moved to be at a different distance from the lens system and any one of the other planes at those consecutive times, for producing still or motion pictures or continuous television signals of each sub-image so formed at each different plane, such that those pictures or signals differ only as to the sharpness of focus of different objects at different ranges from the single objective lens system.

3. An electronic mathmatical means for comparing two or more of such television signals as produced from the whole sub-images in claims 1 or 2, that will instanteneously analyze and select those portions of the sub-images that are in-focus and for the instantaneous switching from one sub-image signal to any other sub-image signal to produce a single continuous composite signal comprising the in-focus portions only of each of two or more whole sub-images.

4. An electronic mathmatical means for comparing two or more of such television signals as produced from the whole sub-images in claims 1 or 2, that will instantaneously analyze and select those portions of the sub-images compared that are in-focus, for the instantaneous suppressing of any portion of a sub-image signal that is out-of-focus such as will be used to produce new whole sub-images in which the out-of-focus portions are eliminated, and for the production of film masks from the new sub-images so produced, and the production of new still or motion pictures using those masks to produce a final composite still or motion picture film in which all portions of the whole frame are in focus.

5. An electronic mathmatical means for monitoring, and analysing the television signals produced from the whole sub-images in claims 1 or 2, and means for permitting a human operator to consider them subjectively at the same instant, and a means for the operator, if inclined, to modify the sub-images instantaneously, such that out-of-focus portions of the original whole sub-image may be displayed or transmitted in better focus, improved to any degree chosen by the operator.

6. A means whereby a single television signal produced by a single conventional lens system of any conventional camera or optical instrument falling upon a single plane, or television signals produced from still or motion pictures taken with such conventional cameras or optical instruments, may be considered subjectively by a human operator, and a means for the operator, if inclined, to modify the signals, such that a new signal may be produced and formed into a television picture or still or motion picture, in which all out-of-focus portions of the original image may be viewed in better focus, improved to any degree chosen by the operator.

7. Means for producing the images, sub-images and modified and composite images in claims 1,2,3,4,5 or 6 on film, in momochrome or colour, x-ray, infra-red, ultra-violet and all other frequencies above and below the visible light range, coherent or otherwise.

8. Means for producing the images, sub-images and modified and composite images in claims 1,2,3,4,5 or 6 as still or motion pictures, for recording on any material or for transmission by electronic, wireless radio, cable or other means.

* * * * *